United States Patent [19]

Schmid

[11] Patent Number: 5,035,795
[45] Date of Patent: Jul. 30, 1991

[54] MODULAR CLARIFIER WITH INTEGRAL FLOCCULATOR

[75] Inventor: Lawrence A. Schmid, Manhattan, Kans.

[73] Assignee: Aero-Mod, Inc., Manhattan, Kans.

[21] Appl. No.: 522,252

[22] Filed: May 11, 1990

[51] Int. Cl.$^5$ .................. C02F 11/14; B01D 21/24
[52] U.S. Cl. .................. 210/197; 210/207; 210/221.2; 210/532.1; 210/534; 210/260
[58] Field of Search ............ 210/197, 205, 207, 221.2, 210/519, 532.1, 533, 534, 260

[56] References Cited

U.S. PATENT DOCUMENTS

| | | | |
|---|---|---|---|
| 1,912,595 | 6/1933 | Schlenz | 210/532.1 |
| 3,239,067 | 3/1966 | Hikes et al. | 210/531.1 |
| 3,744,643 | 7/1973 | Tsunoda | 210/534 |
| 3,975,276 | 8/1976 | Schmid | 210/207 |

Primary Examiner—Stanley S. Silverman
Assistant Examiner—Neil M. McCarthy
Attorney, Agent, or Firm—Hovey, Williams, Timmons & Collins

[57] ABSTRACT

A waste treatment module (10) designed for placement within an aeration basin (12) is provided which performs all of the desirable functions of aeration, flocculation, sedimentation, sludge return, effluent collection and skimming. the module (10) includes walls (20) defining an upright chamber (22); the latter is provided with a pair of side marginal, slotted inlets (28, 30) with corresponding flocculators (24, 26) below the respective inlets (28, 30). Each flocculator (24, 26) is equipped with a plurality of vertically spaced baffle plates (86, 88, 90) having offset openings (92, 94, 96, 98) so as to cause solids within the wastewater to traverse a tortuous descending flow path which promotes flocculation. An agglomerated flocculent is collected within a lower sedimentation zone (34) and then passes into a central collector (108) of inverted V-shaped configuration. Suction airlift pumping devices (118, 122) communicating with the collector (108) serve to elevate the flocculent to a trough (120), whereupon the flocculent is returned to basin (12). Clarified liquid passes through intake pipes (124, 126) and then into specialized weir devices (132, 134) for discharge to a stream or the like. The module (10) is also equipped with exterior aerators (160), floating skimmers (152) and optional devices (174, 176) for introduction of chemical treating agent into the wastewater adjacent the module inlets (62, 64).

10 Claims, 3 Drawing Sheets

MODULAR CLARIFIER WITH INTEGRAL FLOCCULATOR

BACKGROUND OF THE INVENTION

1. Field of the Invention

The present invention is broadly concerned with a modular waste treatment apparatus of the type designed to be placed, either singly or in parallel relationship with other modules, in a waste treatment basin in order to provide the primary functions of aeration and sedimentation as a part of an activated sludge system. More particularly, it is concerned with such a module which efficiently performs the function of aeration, flocculation, sedimentation, sludge return, effluent collection and skimming, all with a minimum of utility and overhead expense. Particular features of the module include a novel waste inlet/flocculation compartment which promotes a agglomeration of solid waste particles as an aid to sedimentation within the module; and a collection/solids withdrawal apparatus serving to uniformly pump collected solids upwardly for return to the basin.

2. Description of the Prior Art

Newly developed housing communities or mobile home parks often are not connected with large, existing municipal sewage treatment systems. As a consequence, builders of these communities are often required to provide a sewage treatment facility as a part of the overall development plan. It has been known in the past to construct concrete sewage collection basins for these purposes, and to install one or more modular treatment units within the basin to handle the sewage load. For example, U.S. Pat. No. 3,975,276 describes such a modular device which has achieved widespread use.

Generally speaking, treatment of solids-containing liquid waste in modular basin systems involves aerating the wastewater so that bacteria will grow that consume the pollutants therein, thereby inducing further bacterial growth. Eventually, a flocculent suspension is created (often referred to in the art as "mixed liquor"), and if this suspension is settled out a clear supernatant, with the pollutants removed, may be withdrawn for direct discharge into natural receiving bodies of water. The settled suspension remains in the basin, however, so that the bacterial suspension can continue to consume wastewater pollutants. This suspension must not be allowed to sit quiescent for an extended period within the basin, or it will start to self-decompose, releasing gasses into the settled sludge mass. This in turn will cause the sludge to lighten and float to the surface, where it will contaminate the otherwise clean water supernatant that is to be discharged.

Accordingly, in order to render the activated sludge process efficient, the settled sludge suspension must be uniformly handled, mixed and returned to the basin so as to inhibit self-decomposition thereof. At the same time however, the handling of wastewater solids must not create undue currents which interfere with the necessary settling and pollutant consumption. This is a distinct problem with many prior art clarifiers, which actually create sizeable currents by virtue of the manner in which the suspension is introduced into the clarifier. Prior expedients used to convey the suspension into clarifiers involve pipes, slots and baffles of many different designs which attempt to prevent and reduce undue entrance currents.

Prior workers have understood that settling or flocculation of solids within a quiescent zone can best occur when the solid particles have first been introduced into a zone of gentle mixing where the particles may agglomerate or flocculate into larger sizes. If then directed into a quiescent area, they will settle faster and much more effectively. While this settling mechanism has been appreciated, little has been done to effectively implement it. Normally, this would require a separate flocculation basin between an aeration tank and a sedimentation tank, through which the waste would flow. To keep solids from settling out within this flocculation basin, and to provide gentle agitation to promote flocculation, it would be necessary to add mechanical mixing devices, which in turn adds both capital and operating expense to the system. Because of these difficulties, most conventional clarifier designs directly introduce agitated suspension without an intermediate flocculation stage. This has correspondingly detracted from the efficiency of prior clarifier designs.

SUMMARY OF THE INVENTION

The present invention overcomes the problems outlined above and provides a greatly improved waste treatment module adapted to be positioned within a basin for the treatment of solids-containing liquid waste therein. The module of the invention can be used alone or in parallel with additional modules, and performs all of the necessary functions of aeration, flocculation, sedimentation, sludge return, effluent collection and skimming.

Broadly speaking, the waste treatment module of the invention includes metallic walls defining an upright treatment chamber having a liquid waste inlet adjacent the upper end of the chamber, together with means within the chamber and beneath the inlet for promoting the flocculation of waste solids prior to collection thereof. Such flocculation is enhanced by provision of structure within the module chamber for causing the solids to traverse, a tortuous, descending flow path. The overall module further includes means defining a sedimentation zone below the flocculating structure for permitting collection of flocculent. In order to prevent self-decomposition of the flocculent within the chamber, a suction airlift-type withdrawal assembly is provided in the form of upright withdrawal pipes communicating with the sedimentation zone. Finally, the module includes means adjacent the upper ends of the chamber for withdrawing treated and clarified liquid to permit discharge thereof into a stream or the like.

In particularly preferred forms of the invention, the module is provided with a pair of elongated, side marginal inlets, each in the form of a metallic screen and each cooperating with an underlying, multiple baffle plate flocculator serving to promote the agglomeration of solids. Efficient collection of flocculent within the chamber is assured by provision of upright, inclined, opposed converging walls beneath the respective flocculators whereby flocculent will gravitate to the lower region of the chamber. The lower sedimentation zone is equipped with an upright, closed-top collector, preferably in the form of an inverted V-shaped member having entrance apertures along the lower margins thereof. A plurality of spaced, elongated, upright withdrawal pipes extend through the closed-top collector and communicate with the interior thereof, and receive respective compressed air outlet conduits which are used for introducing compressed air adjacent the lower ends of the pipes; in this fashion, a suction airlift pumping action is created which withdrawals collected flocculent from the chamber at a uniform rate and delivers the flocculent upwardly for return to the basin.

DESCRIPTION OF THE PREFERRED EMBODIMENT

Figure 1:
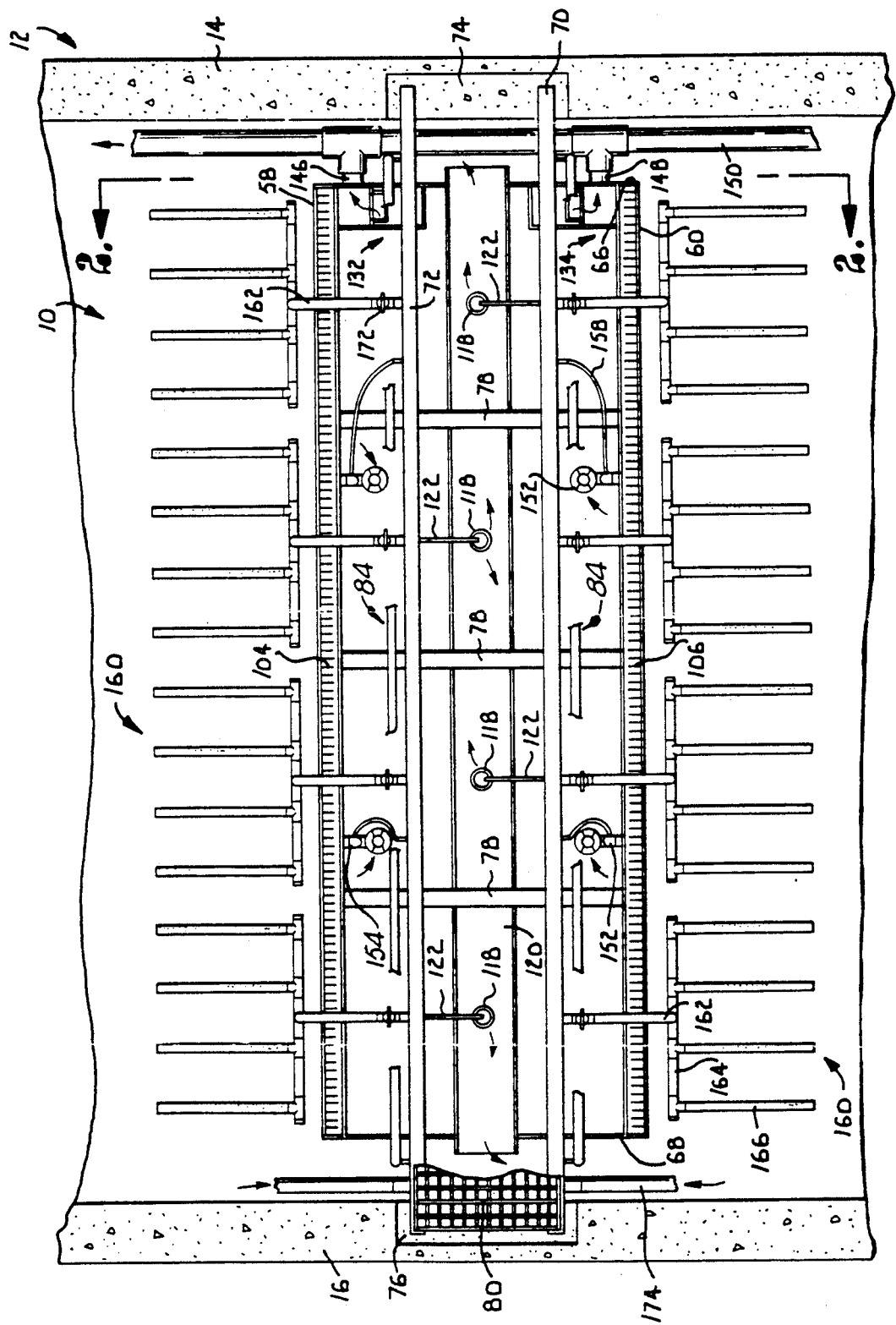
FIG. 1 is a plan view with parts broken away for clarity and illustrating a treatment module in accordance with the invention, mounted within a concrete aeration basin.
Figure 2:
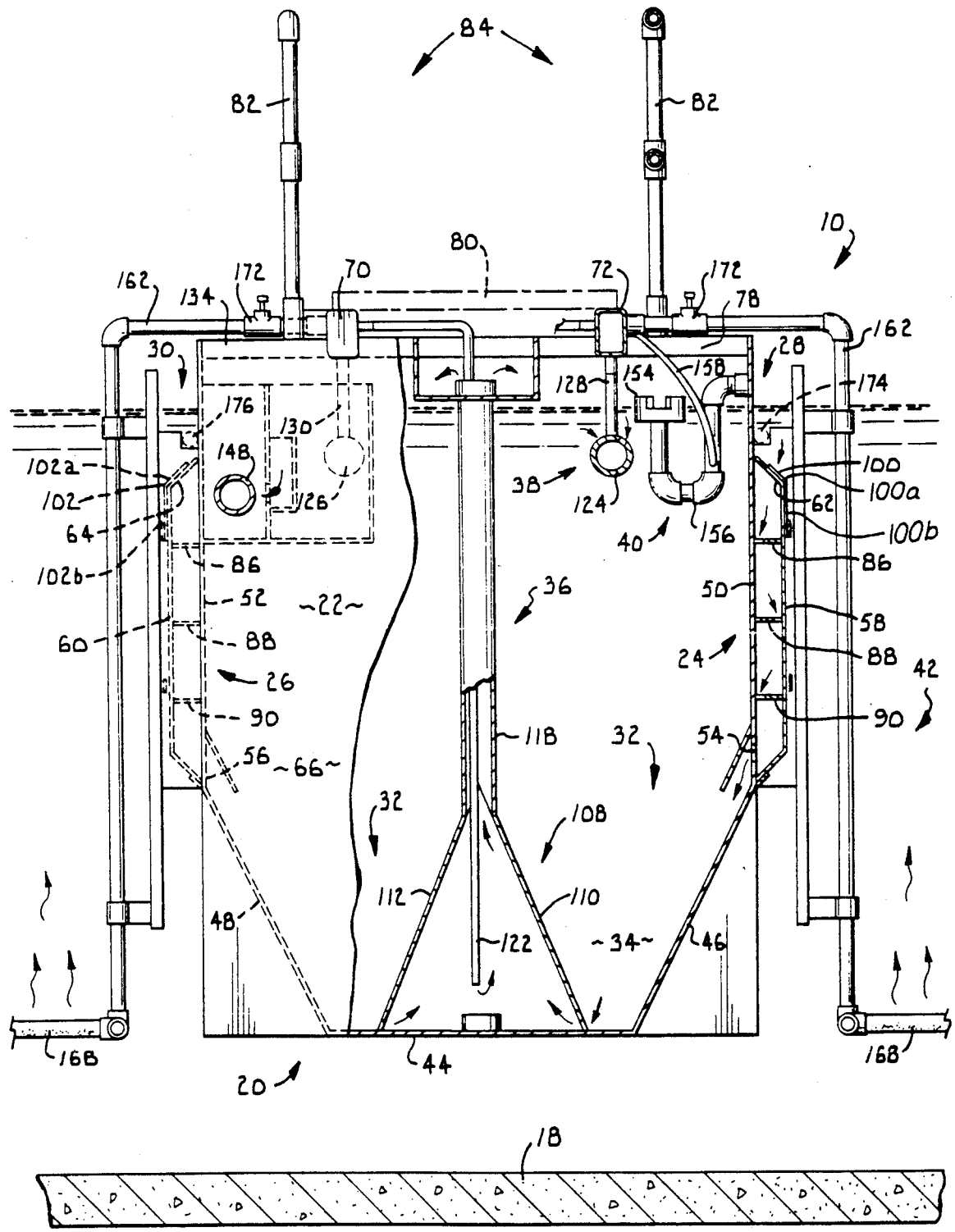
FIG. 2 is a vertical sectional view, with parts broken away, taken along line 2—2 of FIG. 1.

Turning now to the drawings, a waste treatment module 10 is illustrated in FIGS. 1 and 2, mounted within an open-top concrete aeration basin 12. The latter includes upright sidewalls 14, 16 as well as bottom wall 18. As illustrated in FIG. 1, the module 10 is suspended within the basin 12 and is supported by the basin sidewalls 14, 16.

Module 10 includes walls generally referred to by the numeral 20 which define an upright, open-top, internal chamber 22. In addition, the overall module 10 includes side marginal flocculator devices 24, 26 surmounted by respective wastewater inlets 28, 30 and communicating with the interior chamber 22. Wall means 32 within the chamber serves to define a sedimentation zone 34 adjacent the lower region of the module, while flocculent withdrawal apparatus 36 is provided for evenly elevating collected flocculent and delivering same back to basin 12. Finally, the overall module 10 includes means 38 for withdrawing treated, clarified liquid from the module confines; multiple skimmer apparatus 40; and exterior aeration assembly 42.

In more detail, the chamber-defining walls 20 include flat bottom wall 44, upwardly extending, inclined walls 46, 48, and vertically extending primary chamber walls 50, 52 which are provided with a series of spaced apart openings 54, 56 adjacent the lower end thereof proximal to the associated inclined walls 46, 48. A pair of sectionalized, somewhat U-shaped flocculator walls 58, 60 are secured to the associated primary walls 50, 52 as shown, and terminate in uppermost, open, inlet-defining segments 62, 64. Finally, a pair of apertured end walls 66, 68 are secured to the described upright walls for creating the enclosed, open-top chamber 22.

A pair of elongated, hollow, laterally spaced apart beams 70, 72 are secured to the upper margins of the end walls 66, 68, and are of a length to extend for engaging appropriate recessed areas 74, 76 in the basin sidewalls 14, 16 (see FIG. 1) in order to suspend module 10 within the basin 10. Transversely extending crossbeams 78 serve to interconnect the primary beam 70, 72 in order to rigidify the entire module apparatus. A metallic walkway 80 is removably positioned in spanning relationship across the beams 70, 72, with the crossbeams 78 supporting upright standards 82 forming a part of conventional handrails 84 on opposite sides of walkway 80.

Figure 3:
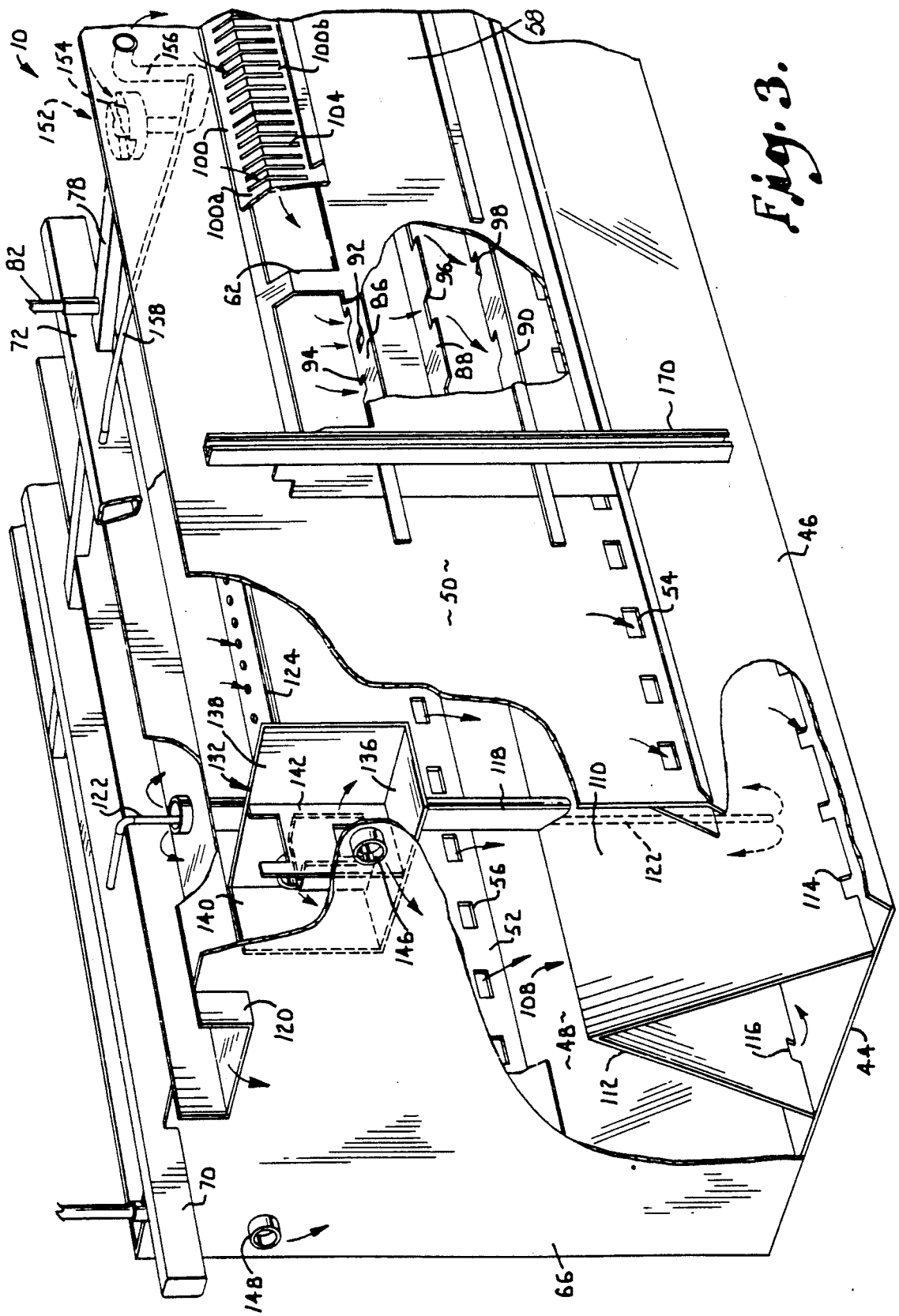
FIG. 3 is a fragmentary isometric view of the preferred waste treatment module, with certain parts broken away and certain shown in phantom.

Each of the flocculator devices 24, 26 is identical and includes a series of three superposed, vertically spaced apart baffle plates 86, 88 and 90 respectively secured between the adjacent walls 50, 58 and 52, 60. As best seen in FIG. 3, uppermost baffle plate 86 is provided with a series of central openings 92 therethrough, as well as a plurality of marginal cutouts 94 adjacent wall 50. The secondary baffle plate on the other hand includes rectangular openings 96 adjacent outboard wall 58 which are both larger than and laterally offset relative to the cutouts 94. Finally, the lowermost baffle plate 90 is provided with marginal openings 98 adjacent inboard wall 50 and offset from the openings 96 thereabove.

Each of the inlets 28, 30 are likewise identical and are in the form of metallic plates 100, 102 positioned atop and in conforming relationship with the underlying inlet segments 62, 64. Again viewing FIG. 3, it will be seen that the respective plates 100, 102 include an uppermost inclined portion 100a, 102a with a depending, essentially vertical portion 100b, 102b. Moreover, these members are provided with a series of narrow (e.g., about ⅛ inch in width) slots 104, 106 therethrough whereby to permit entrance of liquid and small waste particles into module 10.

As will be readily appreciated from a study of FIG. 2, the sedimentation zone walls 32 include the respective inclined walls 46, 44 which are located below the openings 54, 56. These walls are of course formed of an appropriate metal, and are advantageously coated with a conventional epoxy so as to facilitate gravitation of flocculent toward zone 34 as will be described in greater detail hereinafter. In addition, however, an elongated collector 108 is positioned within module 10 on bottom wall 44 and is in the form of an inverted V-shaped member presenting opposed, diverging sidewalls 110, 112, likewise formed of metal and likewise having the exterior faces thereof epoxy coated. It will thus be seen that the zone-defining sidewalls 32 include both the inclined sidewalls 46, 48, as well as the adjacent collector sidewalls 110, 112.

Referring particularly to FIG. 3, it will be observed that each of the collector walls 110, 112 is provided with a series of spaced apart inlet openings 114, 116 along the bottom margins thereof which communicate the interior of the collector 108 with the remainder of chamber 22. A plurality of upstanding, hollow withdrawal pipes 118 extend through the uppermost peak region of collector 108 and communicate with the interior thereof. The upper ends of these pipes 118 extend through and are secured to an elongated, open-top, flocculent trough 120 positioned directly below walkway 80 and of a length to discharge directly into basin 12 from the opposed ends of the trough. A relatively small diameter compressed air conduit 122 is received within each pipe 118 and extends to a point close to bottom wall 44 (see FIG. 2). Each of these conduits 122 is connected at the upper end thereof to a corresponding hollow beam 70, 72, for purposes which will be made clear.

The clarified liquid withdrawal means 38 is in the form of a pair of elongated, apertured, horizontally extending liquid intake pipes 124, 126 within chamber 22 and below the normal level of liquid therein. The intake pipes 124, 126 are suspended from the beams 70, 72 by means of depending members 128, 130 as best illustrated in FIG. 2. As shown, the members 128, 130 do not provide communication between the interior of beam 70, 72 and the intake pipes; however, if desired, these members may be in the form of hollow pipes with valves interposed therein, to assist in ice breakup during wintertime operations as will be described. In any event, the ends of the intake pipes 124, 126 adjacent endwall 66 communicate with weir box devices 132, 134. Each of these devices is identical and includes a bottom wall 136 and upright side and endwalls 138, 140. An internal, upright, generally U-shaped weir plate 142 is centrally located between endwall 140 and the adjacent primary chamber wall 50 or 52. An outlet 146, 148 provided through chamber endwall 66 as illustrated. This weir arrangement is in keeping with the principles described in U.S. Pat. No. 4,474,210 which is incorporated by reference herein, and provides significant operational advantages. Referring to FIG. 1, it wil be seen that the outlets 146, 148 are coupled with a withdrawal main 150 serving to deliver clarified water to a stream or the like.

The module 10 is equipped with a total of four floating skimmers 152 of identical configuration. Each such skimmer includes an annular floating head 154 provided with a small weir, along with a generally U-shaped discharge pipe 156 extending through an associated primary chamber wall 50, 52. Additionally, a compressed air line 158 extends from a hollow beam 70, 72 to each pipe 156, so as to supply operating compressed air to each skimmer 152.

The aeration assembly 42 includes a series of eight identical aerators 160 with four such aerators being located along an outboard each side of module 10. Each aerator 160 includes an air supply pipe 162 leading to a lowermost, horizontally extending header 164. A series of four spaced apart, elongated, outwardly extending, apertured air supply pipes 166 are operatively coupled with each header. Each pipe 166 are advantageously formed of plastic and has relatively large holes drilled therethrough. Resilient or rubber-type coverings 168 having numerous small holes therethrough are placed over each pipe 166, such that when compressed air is introduced into the pipes 166, a cloud of fine bubbles are created. Each of the upstanding supply pipes 162 are supported by means of a corresponding U-shaped bracket 170 affixed to module 10. The upper ends of these supply mains extend inwardly and are operatively connected to an associated hollow beam 70, 72, with an air valve 172 being provided as shown.

As explained previously, the beams 70, 72 serve as a primary structural support for module 10. In addition, however, these hollow beams also supply compressed air for the operation of module 10, and particularly to the conduits 122, air lines 158 and supply mains 162 thereof. To this end, a compressed air line 174 is operatively coupled between a source of compressed air (not shown) and the interiors of the beams 70, 72 adjacent endwall 66.

In many instances it is desirable to inject chemical treating agents such as an aluminum or iron salt into waste liquids to be treated. Often, it is difficult to obtain an even distribution of chemical dosages. However, the present module provides the optional ability to efficiently add such treating agents. Referring to FIG. 2, it will be seen that elongated addition pipes 174, 176 may be positioned above each inlet 28, 30 for this purpose. These addition pipes are in turn connected to a source (not shown) of treating agent. If desired, small, depending tubes (not shown) may be attached to the pipes 174, 176 for direct feeding of treating agent into the flocculating devices 24, 26. In any event, placement of the addition pipes 174, 176 adjacent the inlets thus assures uniform introduction of treating agent at a point where efficient chemical mixing can occur.

The operation of module 10 within a basin 12 filled with solids-containing wastewater will next be described. In this regard, it will be assumed that compressed air is being delivered via line 174 into and through the beam 70, 72, so as to correspondingly provide such air to aerators 160, skimmers 152 and conduits 122. The aerators 160 are used to introduce air into the main body of waste liquid within basin 12 and by virtue of the rubber-like coverings 168 described previously, a desirable "cloud" of fine air bubbles is created in order to provide the most effective aeration.

Solids-containing waste liquid enters module 10 through the inlet plates 100, 102. By virtue of the thin slots 104, 106, most debris is kept out of the chamber 22, while bacterial suspension is allowed to pass. Collection of solids on the plates 100, 102 is minimized because of the relatively rapid velocity of the liquid across the plates, such being induced by the diffusers creating an upward velocity along the module and the thin slots.

As the solids-containing liquid passes the inlets it next descends into and through the flocculating devices 24, 26. The baffle plates 86-90 contain openings as described, preferably occupying approximately 30% of the area of each plate. Passage of the liquid through the initial baffle in effect creates currents of increased velocity. The water then appreciably slows down below the first baffle plate, because the flocculation chamber area is relatively large in comparison with the plate openings. Moreover, because of the offset relationship of the openings in the next lower baffle plate (both laterally and vertically) the water must move horizontally in two directions and again accelerate to go through the next set of baffle openings. Although this velocity must be increased to go into the baffle holes, the velocity is still well below that magnitude which would disrupt flock formation. After the wastewater traverses the second baffle plate it again slows down, but must increase yet again to pass the final baffle plate. As such, it will be seen that the flocculators 24, 26 effectively cause the solids to traverse a tortuous descending flow path, and this promotes the growth of larger and stronger flocculations which will settle well. The flocculent and wastewater finally emerges from the devices 24, 26 by passage through lowermost openings 54, 56, and the sizing and location of these openings assures even flow towards and into sedimentation zone 34.

As the flocculated sludge mixture passes through the openings 54, 56, it encounters the converging, epoxy coated walls 46, 110 and 48, 112. The outboard walls 46, 48 are inclined at approximately a 70 degree slope to facilitate sedimentation. When the flocculated sludge enters the zone 34, the upward velocity acting on the sludge is created only by the rate at which the clarified liquid is withdrawn through pipes 118. However, the downward velocity is much greater, particularly because the volume becomes progressively smaller as the bottom of the zone 34 is approached, and because sludge is withdrawn from the bottom at nearly five times the rate at which clarified liquid is withdrawn from the top of module 10. As a consequence, sedimentation of flocculent within the zone 34 is both effective and rapid. By way of example, under normal design conditions, the upward velocity of liquid through the pipes 118 may be 0.05 feet per minute, while the downward velocity of the liquid near the bottom of zone 34 may be 1.2 feet per minute, or nearly 25 times as great. Thus a solid flocculent particle need have a settling velocity induced by gravity only greater than 0.05 feet per minute to be collected in zone 34. Once it enters the zone 34, the flocculent particle is trapped not only by gravity but by the velocity of the liquid.

As described previously, rapid removal of flocculent solids is essential to prevent septic conditions in the sludge which can cause gas productions and entrapment. Moreover, a uniform sludge withdrawal is important to prevent formation of dead spots and minimization of currents which will hinder settling. These requisites are met in the present invention by provision of the collector 108. The lowermost openings 114, 116 permit movement of flocculent into the confines of the collector, while the airlift pipes 118 assure even elevation and recycling of the flocculent. The constant supply of compressed air fed into the collector by means of the conduits 122 creates a vertical airlift suction action serving to effectively pump liquids and settled flocculent upwardly into the trough 120. This suction action also creates a reduced pressure within the chamber 22 drawing liquid from the basin 12 as previously described. Finally, the discharge of compressed air through the conduits 122 creates considerable turbulence within collector 108, preventing solids that enter the collector from continuing to settle and thus enhancing the upward movement thereof.

The described weir devices 132, 134 also provide a significant advantage. Specifically, as the flow into module 10 increases additional solids in terms of total weight will be collected in zones 34. When this occurs, it would be desirable to increase the quantity of pumping and suction uplift so that these solids are removed from the module as fast as they enter to prevent undue accumulation and effluent contamination. The suction airlift pumps afforded by the pipes 118 and conduits 122 operate on the principle that the lower the lift, the greater will be the volume of pumping, so long as the aerate and the pipe size remain constant. However if a restriction is placed on the effluent line, such as that presented by the weir devices 132, 134, the water level across the basin 12 will rise with increased flows, bringing it closer to the elevation of the tops of the airlift pipes 118 and trough 120. As this basin water level rises, the effluent discharge from the module increases, and the volume of liquid and sludge entering zone 34 increases. This automatic lessening of the relative elevation difference between the surrounding liquid and the trough results in a significant increase in pumping rates, allowing the increased accumulated sludge to be removed as rapidly as it enters zone 34. It is also significant that the discharge elevation is relatively close to the nominal liquid level within the module 12, and thus a change in elevation of less than six inches can result in a discharge head change of over 50 percent.

At times the surface of the liquid within module 10 may become coated with light ice coverings or with grease and floating scum. Normally the skimmers 152 would remove this material, but there may be times when undue accumulations may block the skimmers. If the members 128, 130 are in the form of air-conveying pipes and air valves as described, the operator may periodically open these valves and blow positive pressure air from the beams 70, 72 into and out the apertured pipes 124, 126, thereby creating significant turbulence at the surface and breaking up ice or scum so that it can be collected and removed by the skimmers 152.

Of course, if desired or necessary chemical treating agents may be introduced into the wastewater via pipes 174, 176; and again, this is entirely within the discretion of the operator.

I claim:

1. A waste treatment module adapted to be positioned within a basin for the treatment of solids-containing liquid waste therein, said module comprising:

walls defining an upright treatment chamber having a liquid waste inlet adjacent the upper end of the chamber;

means within said chamber and beneath said inlet for promoting the flocculation of waste solids, including flocculation structure for causing said solids to traverse a tortuous, descending flow path within the chamber;

means defining a sedimentation zone below said flocculation-promoting means for permitting collection of flocculent within said chamber, said sedimentation zone-defining structure including apertured walls presenting an upright, closed-top collector;

means communicating with said sedimentation zone for withdrawing portions of the collected flocculent upwardly at a substantially uniform rate for return of the flocculent to said basin, said flocculent-withdrawal means comprising an elongated, upright withdrawal pipe extending through the top of said collector to communicate with the interior thereof, and means for introducing compressed air adjacent the lower end of the withdrawal pipe whereby to create an airlift pumping action for withdrawal of flocculent from said collector and return thereof to the basin; and means adjacent the upper end of said chamber for withdrawing treated liquid therefrom.

2. The module as set forth in claim 1, said inlet comprising an elongated screen presenting a series of narrow, spaced apart slots along the length thereof.

3. The module as set forth in claim 1, there being a pair of liquid waste inlets adjacent the upper end of said chamber and respectively extending along opposite sides thereof.

4. The module as set forth in claim 1, said flocculation structure comprising a plurality of spaced apart, superposed baffle plates positioned beneath said inlet, each of said baffle plates presenting flow passages therethrough, at least certain of said flow passages provided in adjacent baffle plates being relatively offset.

5. The module as set forth in claim 1, said sedimentation zone-defining means comprising a pair of upright, inclined, opposed converging walls beneath said flocculation structure for gravitional collection of flocculent adjacent the lower end of said chamber.

6. The module as set forth in claim 5, said converging walls being formed of metal having an epoxy finish thereon for promoting gravitation of flocculent.

7. The module as set forth in claim 1, including means positioned exteriorly of said chamber for introducing air into the liquid waste within said basin.

8. The module as set forth in claim 1, including means adjacent said waste inlet for addition of treating agents to said liquid waste.

9. The module as set forth in claim 1, including means for skimming the liquid within said chamber, and for returning collected skimmings to said basin.

10. The module as set forth in claim 1, said liquid withdrawing means comprising an elongated, apertured conduit positioned within said module and below the normal liquid level therein.

* * * * *